(12) United States Patent
de Araujo et al.

(10) Patent No.: US 9,534,869 B2
(45) Date of Patent: Jan. 3, 2017

(54) METHOD AND DEVICE FOR IMPROVING THE INERTIAL NAVIGATION OF A PROJECTILE

(71) Applicant: MBDA FRANCE, Le Plessis-Robinson (FR)

(72) Inventors: Bruno de Araujo, Issy-les-Moulineaux (FR); Vincent Guibout, Paris (FR); Eric Larcher, La Garenne-Colombes (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 14/775,260

(22) PCT Filed: Mar. 12, 2014

(86) PCT No.: PCT/FR2014/000053
§ 371 (c)(1),
(2) Date: Sep. 11, 2015

(87) PCT Pub. No.: WO2014/147302
PCT Pub. Date: Sep. 25, 2014

(65) Prior Publication Data
US 2016/0047629 A1 Feb. 18, 2016

(30) Foreign Application Priority Data
Mar. 20, 2013 (FR) .................................... 13 00646

(51) Int. Cl.
*F41G 7/36* (2006.01)
*G05D 1/12* (2006.01)
(Continued)

(52) U.S. Cl.
CPC ................. *F41G 7/36* (2013.01); *F41G 7/007* (2013.01); *G01C 21/16* (2013.01); *G05D 1/107* (2013.01); *G05D 1/12* (2013.01)

(58) Field of Classification Search
CPC .............. F41G 7/36; F41G 7/007; G05D 1/12; G05D 1/107; G01C 21/16
See application file for complete search history.

(56) References Cited

U.S. PATENT DOCUMENTS 5,150,856 A 9/1992 Gaide
5,719,772 A * 2/1998 Benes ....................... G01P 9/00
701/507

(Continued)

FOREIGN PATENT DOCUMENTS

DE GB 1149435 A * 4/1969 ............... F41G 7/30
EP 0 484 202 B1 5/1992

OTHER PUBLICATIONS

International Search Report mailed Apr. 28, 2014, issued in corresponding International Application No. PCT/FR2014/000053, filed Mar. 12, 2014, 2 pages.

(Continued)

*Primary Examiner* — Rodney Butler
(74) *Attorney, Agent, or Firm* — Christensen O'Connor Johnson Kindness PLLC

(57) ABSTRACT

A method for the inertial navigation of a projectile equipped with a mediocre-quality inertial init that is fired from a carrier equipped with a precision inertial unit includes, before firing the projectile, the biases of the accelerometers and of the gyrometers of the inertial unit of the projectile are determined using the inertial unit of the carrier. During the inertial navigation of the projectile, the measurements of the accelermeters and of the gyrometers output by the inertial unit of the projectile are corrected by the biases determined before launching.

7 Claims, 1 Drawing Sheet

(51) Int. Cl.
  *F41G 7/00* (2006.01)
  *G05D 1/10* (2006.01)
  *G01C 21/16* (2006.01)

(56) References Cited

U.S. PATENT DOCUMENTS

| | | | | |
|---|---|---|---|---|
| 5,948,045 | A * | 9/1999 | Reiner | F41G 7/007 244/177 |
| 6,032,099 | A * | 2/2000 | Fernandez | G01C 21/16 701/505 |
| 8,812,233 | B2 * | 8/2014 | Kontz | 701/502 |
| 2010/0299003 | A1 * | 11/2010 | Hanson | G01C 23/00 701/4 |

OTHER PUBLICATIONS

Ross, C.C., et al., "A Transfer Alignment Algorithm Study Based on Actual Flight Test Data From a Tactical Air-to-Ground Weapon Launch," IEEE Position Location and Navigation Symposium, Las Vegas, Nev., Apr. 11-15, 1994, pp. 431-438.

* cited by examiner

METHOD AND DEVICE FOR IMPROVING THE INERTIAL NAVIGATION OF A PROJECTILE

SUMMARY

The present invention relates to a method and to a device for improving the inertial navigation of a projectile.

Although not exclusively, it is particularly suitable for being implemented with tactical missiles, for example of the anti-tank or anti-bunker type, the range of which is a few kilometers (medium range).

It is known that such missiles may have an inertial unit allowing them to have partially or totally inertial navigation. However, since these missiles are destroyed when they reach their target, the inertial units that they have on board are not, for cost reasons, high-performance inertial units, which, because of this, have accelerometric or gyrometric biases.

It goes without saying that these accelerometric and gyrometric biases cause errors in navigation drift, in position and in attitude, limiting the useful range of said missiles.

To remedy such drawbacks, it is conceivable to use an inertial unit of better quality, to provide a complementary sensor (for example of the GPS type) and/or, in the case in which the missile comprises a homing device, to increase the range or the size of the field of vision of this homing device. However, such measures necessarily give rise to an additional cost for the missiles.

The object of the present invention is to remedy this drawback by reducing the errors due to the biases of the accelerometers and of the gyrometers of the mediocre-quality inertial unit of the missiles and therefore improving the inertial navigation performance of said missiles, avoiding any recourse to a measure giving rise to an additional cost.

To this end, according to the invention, the method for improving the inertial navigation of a projectile equipped with a mediocre-quality inertial unit and fired from a carrier equipped with a precision inertial unit, is remarkable in that:

before the firing of said projectile from the carrier, the mean biases of the accelerometers and of the gyrometers of the inertial unit of said projectile are determined by means of the inertial unit of said carrier; and during the inertial navigation of said projectile, the accelerometric and gyrometric measurements provided by said inertial unit of said projectile are corrected by said mean biases determined before firing.

Thus, by virtue of the invention, account is taken of the mean biases of the accelerometers and of the gyrometers that create the main navigation errors, so that the inertial navigation of said projectile can be satisfactory despite the mediocre quality of the inertial unit. The method according to the present invention is based on the observation of the applicant that the accelerometric and gyrometric biases of such an inertial unit are relatively stable over time and that the variations in these biases, during the flight of the missile, are negligible compared with the absolute values of the biases determined before the launch of the projectile.

It should be noted that the inertial unit of the projectile and the inertial unit of the carrier each have their own system of reference axes with respect to which they provide their accelerometric and gyrometric measurements and that these two systems of reference axes are fixed with respect to each other, in terms of position and orientation, as long as said missile is not fired.

Thus, for determining said biases of the inertial unit of said projectile, it is advantageous for the accelerometric and gyrometric measurements of one of the inertial units to be, by a transformation taking into account the relative position and orientation of the two systems of axes, expressed in the reference axis system of the other of said inertial units. In this case, it is provided that:

when the inertial unit of the carrier is already in operation, the inertial unit of the projectile is started, the accelerometric and gyrometric measurements of one of the inertial units are, by means of said transformation taking in account the relative position and orientation of the two reference axis systems, expressed in the reference axis system of the other of said inertial units; and in the axis system of said other of said inertial units, the accelerometric and gyrometric measurements of the two inertial units are compared by taking the difference.

Preferably:

the differences in accelerometric and gyrometric measurements thus obtained are filtered in order to obtain current estimates of the mean biases of the accelerometers and gyrometers of the inertial unit of said projectile; and at the moment of firing of the projectile, the above process of obtaining said current estimates of the mean biases is stopped and the last values of these, which constitute the estimates of the mean biases of the accelerometers and gyrometers of the inertial unit of the projectile, are kept.

Moreover, during the flight of said projectile, the following operations are performed continuously:

differentiating between the instantaneous measurements of the accelerometers and of the gyrometers of the inertial unit of the projectile and said estimates of the mean biases, in order to obtain corrected accelerometric and gyrometric measurements of the projectile; and using these corrected accelerometric and gyrometric measurements in the inertial navigation of said projectile.

The present invention also relates to a device for improving the inertial navigation of a projectile equipped with an inertial unit of mediocre quality and fired from a carrier equipped with a precision inertial unit, said units each having their own reference axis system with respect to which they provide their accelerometric and gyrometric measurements, and these two reference axis systems being fixed with respect to each other, in terms of position and orientation, as long as said projectile is not fired.

According to the present invention, this device is remarkable in that it comprises:

computing means making it possible, by means of a transformation taking into account the relative position and orientation of the two axis systems, to express the accelerometric and gyrometric measurements of one of the inertial units in the reference axis system of the other of said inertial units; and comparison means for comparing, in this reference axis system of said other of said inertial units, the accelerometric and gyrometric measurements of the two inertial units.

In addition, the device according to the present invention comprises:

a filter for filtering the differences in accelerometric and gyrometric measurements resulting from the comparison using said comparison means and for obtaining current estimates of the mean biases of the accelerometers and gyrometers of the inertial unit of said projectile; and a subtractor for subtracting, from the instantaneous measurements of the accelerometers and gyrometers of the inertial unit of the projectile in flight, the last values, before firing, of said estimates of current biases.

DESCRIPTION OF THE DRAWING

The figures of the accompanying drawings will give a clear understanding as to how the invention can be implemented. In these figures, identical reference numerals designate similar elements.

DETAILED DESCRIPTION

Figure 1:
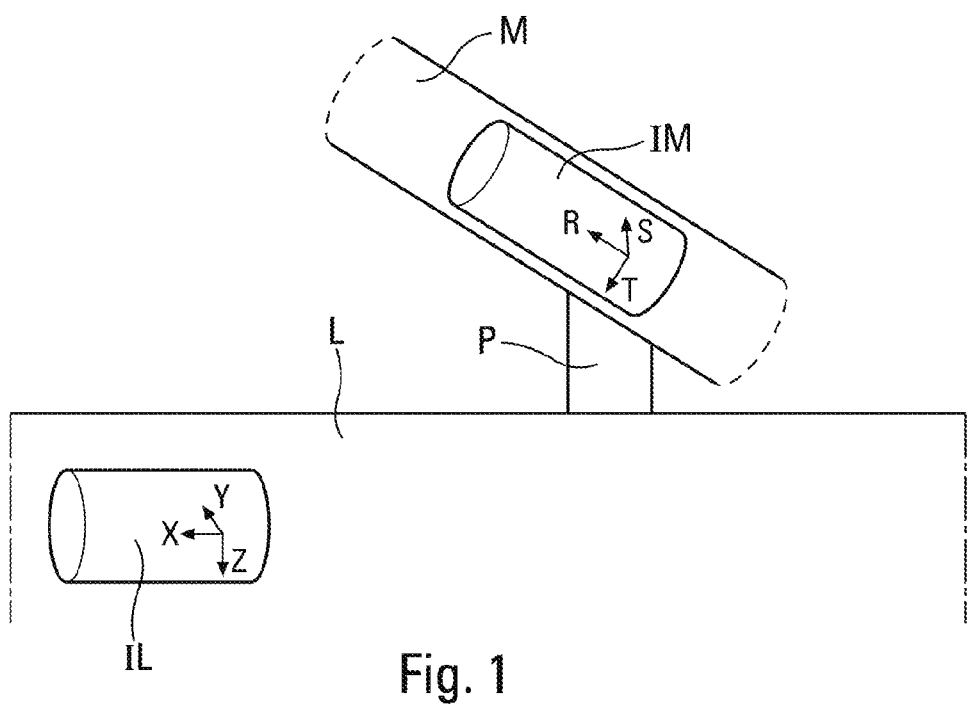
FIG. 1 is a partial schematic view, before firing, of a missile carried by a carrier.

FIG. 1 schematically depicts a projectile M, for example a medium-range (a few kilometers) tactical missile, rigidly mounted on a carrier L, for example a land vehicle, an aircraft, etc., by means of mast P.

The projectile M comprises an inertial unit IM, for example with three accelerometers and three gyrometers (not shown) defining a reference axis system R, S and T. Likewise the carrier L comprises an inertial unit IL, for example with three accelerometers and three gyrometers (not shown) defining a reference axis system X, Y and Z.

Before the firing of the projectile M from the carrier L, the relative position and the relative orientation of the two reference axis systems R, S, T and X, Y, Z are fixed and known, as a result of the known rigid positioning of the projectile M on the carrier L. It is therefore possible, by means of a suitable mathematical transformation, to express the accelerometric and gyrometric measurements of one of the inertial units IM or IL in the reference axis system of the other of said inertial units IL or IM.

Figure 2:
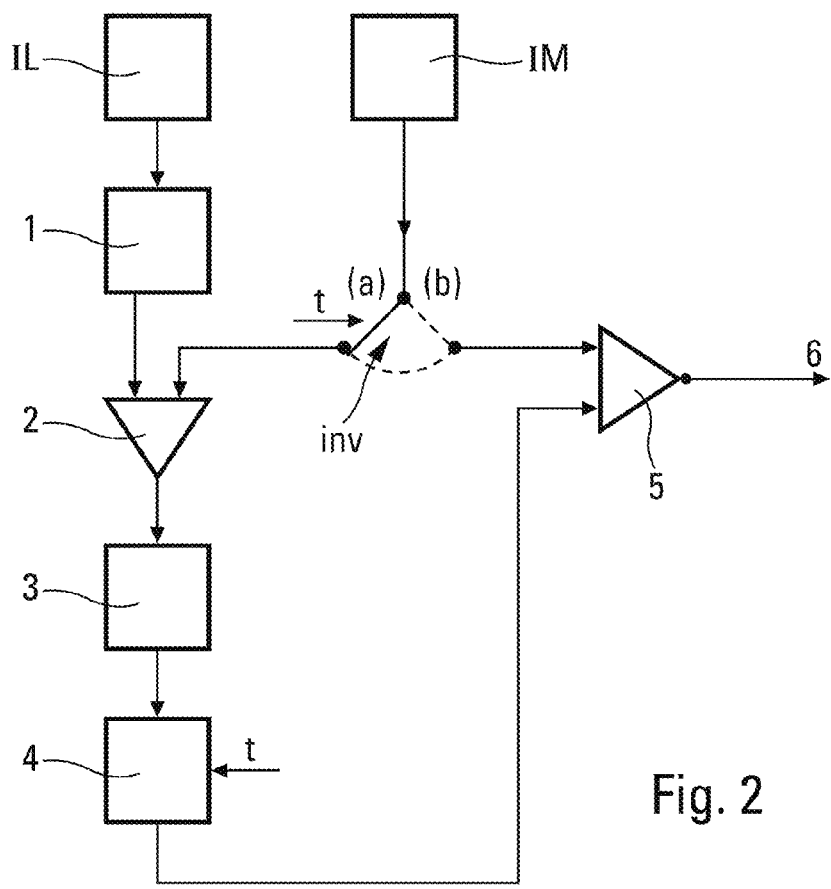
FIG. 2 is a block diagram illustrating the present invention.

This property is used by the present invention, as illustrated by the block diagram in FIG. 2.

This figure shows a computer 1 for making this transformation and expressing the accelerometric and gyrometric measurements AXL, AYL, AZL, pL, qL and rL, which it receives from the inertial unit IL of the carrier L in the reference axis system R, S, T of the inertial unit IM of the projectile M. Hereafter, these accelerometric and gyrometric measurements that underwent the transformation in the computer 1 are referenced AXL', AYL', AZL', pL', qL' and rL'.

Since these transformed accelerometric and gyrometric measurements are now located in the same reference axis system R, S, T as the accelerometric and gyrometric measurements of the inertial unit IM of the projectile M (hereinafter referenced ARM, ASM, ATM, pM, qM and rM), they can be compared with said measurements in a comparator 2 (in FIG. 2, the connection between the inertial unit IM and the comparator 2 is represented schematically by a position a of a controllable inverter inv).

Thus, at the output of the comparator 2, the following differences are obtained:

$\Delta AX = ARM - AXL'$ $\Delta AY = ASM - AYL'$ $\Delta AZ = ATM - AZL'$ $\Delta p = pM - pL'$ $\Delta q = qM - qL'$ $\Delta r = rM - rL'$ which express the instantaneous biases of the inertial unit IM of the projectile M with respect to the measurements of the inertial units IL of the carrier L.

From the above, it will therefore be understood easily that if, before the firing of the projectile M from the carrier L and when the inertial unit IL of said carrier is operating, the inertial unit IM of the projectile M is operated, it is possible to obtain continuously these instantaneous biases $\Delta AX$, $\Delta AY$, $\Delta AZ$, $\Delta p$, $\Delta q$ and $\Delta r$ of the inertial unit IM.

To preserve the low frequencies, that is to say the mean biases, and to filter the measurement noises, said instantaneous biases appearing at the output of the comparator 2 are filtered by a filter 3, these filtered instantaneous biases therefore constituting current estimates of the mean biases of the accelerometers and gyrometers of the inertial unit IM of the projectile M.

At the instant of firing, the process described above of determining the current estimates of the mean biases of the unit IM is stopped and the last value of each of said current estimates is recorded in a memory 4 (in FIG. 2, these actions at the instant of firing are represented by arrows t that act on the memory 4 and on the inverter inv order to cause it to adopt its position b connecting the inertial unit to a comparator 5). These last values of the current estimates of the mean biases of the unit IM then constitute the best estimates available of the inertial unit IM of the projectile M and can be referenced by bias ARM, bias ASM, bias ATM, bias pM, bias qM and bias rM.

After firing, during the flight of the projectile M, by means of the comparator 5 receiving both instantaneous accelerometric and gyrometric measurements ARM, ASM, ATM, pM, qM and rM from the inertial unit M and said biases, this comparator 5 can send to the inertial navigation devices of the projectile M the corrected accelerometric and gyrometric measurements ARM—bias ARM, ASM—bias ASM, ATM—bias ATM, pM—bias pM, qM—bias qM and rM—bias rM.

It will be noted that, in the above process, the transformation of the computer 1 could be applied to the inertial unit IM of the projectile M instead of being applied to the inertial unit IL of the carrier L. In addition, although the memory 4 and the comparator 5 must be situated on board the projectile M, the computer 1, the comparator 2 and the filter 3 can be situated either on board the projectile M or on the carrier L. In the latter case, the connection between the filter 3 and the memory 4 is broken at the moment of firing.

The invention claimed is:

1. A method for improving the inertial navigation of a projectile equipped with a mediocre-quality inertial unit and fired from a carrier equipped with a precision inertial unit, comprising the following steps:
    before firing the projectile from the carrier, determining mean biases of accelerometers and of gyrometers of the inertial unit of the projectile from the inertial unit of the carrier;
    firing the projectile from the carrier;
    inertially navigating the projectile while in flight with the inertial unit of the projectile, and
    during the inertial navigation of the projectile, correcting accelerometric and gyrometric measurements provided by the inertial unit of the projectile with the mean biases determined before firing.

2. The method according to claim 1, in which the inertial unit of the projectile and the inertial unit of the carrier each have a reference axis system with respect to which each inertial unit provides accelerometric and gyrometric measurements, the reference axis systems of the projectile and carrier being fixed with respect to each other, in terms of position and orientation, as long as the projectile is not fired, wherein, for determining the mean biases of the inertial unit of the projectile, the accelerometric and gyrometric measurements of one of the projectile or carrier inertial units are, by a mathematical transformation taking into account relative position and orientation of the reference axis systems, expressed in the reference axis system of the other of the projectile or carrier inertial units.

3. The method according to claim 2, wherein:
when the inertial unit of the carrier is already in operation, starting the inertial unit of the projectile,
the accelerometric and gyrometric measurements of one of the projectile or carrier inertial units are, by the mathematical transformation taking into account the relative position and orientation of the reference axis systems, expressed in the reference axis system of the other of the projectile or carrier inertial units; and
in the reference axis system of the other of the projectile or carrier inertial units, comparing the accelerometric and gyrometric measurements of the inertial units by taking a difference between accelerometric measurements of the inertial units and a difference between gyrometric measurements of the inertial units.

4. The method according to claim 3, wherein:
filtering the differences in accelerometric and gyrometric measurements in order to obtain current estimates of the mean biases of the accelerometers and gyrometers of the inertial unit of the projectile; and
at the moment of firing of the projectile, stopping obtaining the current estimates of the mean biases and keeping last obtained values of the estimates of the mean biases of the accelerometers and of the gyrometers of the inertial unit of the projectile.

5. The method according to claim 4, wherein, during the flight of the projectile, the following operations are performed continuously:

differentiating between instantaneous measurements of the accelerometers and of the gyrometers of the inertial unit of the projectile and the estimates of the mean biases, in order to obtain corrected accelerometric and gyrometric measurements of the projectile; and
inertially navigating the projectile with the corrected accelerometric and gyrometric measurements.

6. A device for improving the inertial navigation of a projectile equipped with an inertial unit of mediocre quality and fired from a carrier equipped with a precision inertial unit, the inertial units each having a reference axis system with respect to which each inertial unit provides accelerometric and gyrometric measurements, and the reference axis systems being fixed with respect to each other, in terms of position and orientation, as long as the projectile is not fired, the device comprising:
accelerometers to provide accelerometric measurements;
gyrometers to provide gyrometric measurements;
computing means for mathematically transforming, taking into account relative position and orientation of the reference axis systems, and expressing the accelerometric and gyrometric measurements of one of the inertial units in the reference axis system of the other of the inertial units; and
comparison means for comparing, in the reference axis system of the other of the inertial units, the accelerometric and gyrometric measurements of the inertial units.

7. The device according to claim 6, comprising:
a filter for filtering differences in accelerometric and gyrometric measurements resulting from the comparison using the comparison means and for obtaining current estimates of mean biases of the accelerometers and gyrometers of the inertial unit of the projectile; and
a subtractor for subtracting, from instantaneous measurements of the accelerometers and gyrometers of the inertial unit of the projectile in flight, last obtained values, before firing, of the estimates of the current mean biases.

* * * * *